US007142555B2

United States Patent
Wang (10) Patent No.: US 7,142,555 B2
(45) Date of Patent: Nov. 28, 2006

(54) METHOD AND APPARATUS FOR SWITCHING DATA USING PARALLEL SWITCHING ELEMENTS

(75) Inventor: Yuanlong Wang, Fremont, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1061 days.

(21) Appl. No.: 10/106,645

(22) Filed: Mar. 22, 2002

(65) Prior Publication Data

US 2003/0179759 A1    Sep. 25, 2003

(51) Int. Cl.
*H04L 12/28* (2006.01)
(52) U.S. Cl. .................. 370/429; 370/413; 370/399
(58) Field of Classification Search ............... None
See application file for complete search history.

(56) References Cited

U.S. PATENT DOCUMENTS

| 6,920,131 | B1 * | 7/2005 | Beshai | 370/380 |
| 7,023,841 | B1 * | 4/2006 | Dell et al. | 370/388 |
| 2002/0048280 | A1 * | 4/2002 | Lee et al. | 370/468 |
| 2002/0061020 | A1 * | 5/2002 | Chao et al. | 370/390 |

* cited by examiner

*Primary Examiner*—Doris H. To
*Assistant Examiner*—Thien D. Tran
(74) *Attorney, Agent, or Firm*—Thomas, Kayden, Horstemeyer, & Risley, LLP (57) ABSTRACT

Data cells arriving in a switching unit are routed to virtual output queues. Load balancing method selects switching elements based on a dynamic utilization tracked by request virtual output queues that store switching requests from the virtual output queues.

20 Claims, 7 Drawing Sheets

METHOD AND APPARATUS FOR SWITCHING DATA USING PARALLEL SWITCHING ELEMENTS

FIELD OF THE INVENTION

This invention relates generally to telecommunications and specifically to high-speed data switches.

BACKGROUND OF THE INVENTION

Today's modern telecommunication depends on high-speed, reliable, and low-cost transmission of digital data. High-speed digital data transmission is a growing and necessary part of everyday communications and supports the function of information appliances such as telephones, televisions, personal computers, and personal data assistants. With the unprecedented advent of the Internet and growing desire for on-demand interactive entertainment, the need for high-speed data transmission is growing rapidly.

High-speed data transmission is dependent upon the network structure through which data is transmitted. The speeds of these networks are realized through the switches and transmission lines between the source and destination of the data. If any aspect of the network is unreliable or delays transmission, the communication quality may be degraded or corrupted. The composition of the data switches within these networks is a primary factor affecting the speed, reliability and cost of telecommunication.

A data switch is a device that has input and output ports to receive and transmit data packets. A data packet arriving at any input port may emerge from any output port depending on the source and destination of the data. The data switch may receive data at an input port, determine which output port it must emerge from, and then transmit the data from that output port in a very small amount of time. The time required for the data switch to complete these steps is known as its propagation delay.

The time required for the data to travel from its original source to a final destination is known as network delay. Network delay is the sum of the propagation delay for all the switches and transmission lines in the communication path between the source and destination of the data. Since Internet, telephone, and television communications occur over great distances, the network delay must be very small and unnoticeable to maintain high communication quality. Data switch propagation delay must be very small since many data switches may be present in the overall data communication path.

Many data switch designs have emerged. With each successive design, switch propagation delay has been reduced. The objective of reducing propagation delay must be achieved in light of other requirements. High-speed data switches must be scalable, and low-cost.

Network providers want to be able to purchase high-speed data switches that have enough ports to accommodate the needs of their current customers. As their need for network bandwidth increases, these customers also want to be able to expand their capacity at a low cost while maintaining high performance. This attribute is known as scalability and is challenging to achieve because high-speed data switches become more costly and less efficient as the number of input or output ports increase.

Although scalability and cost are key data switch requirements, minimum propagation delay is the single most important attribute of high-speed data switches. As modern technology serves to increase the speed of data transmission over conventional transmission lines, data switches are increasingly enhanced to reduce propagation delay. Just to illustrate the evolutionary trends in propagation delay since the 1980's, data switch propagation delays have decreased from 10 milliseconds to under 50 nanoseconds.

Over the past few decades, a number of data switch architectures have been conceived in attempts to achieve scalability, minimize propagation delay and lower cost. These architectures include multiple high-speed bus and matrix switch designs. High-speed bus switches utilize high-speed input-output data port cards that plug into a common bus on the backplane. The data port cards receive data packets on their input ports, determine which output port card the data must emerge from and then route the data to the output port card. This type of architecture suffers significant performance degradation as additional ports are added. Because all of the port cards reside on a common bus, they compete for its use. Consequently, propagation delay is increased as the data port cards must wait to transmit their data to the specified output ports.

Numerous matrix switch architectures exist. These matrix architectures all share common attributes that give them advantages over the bus architecture. Matrix switches are composed of numerous identical switching elements disposed between input and output ports. Each switching element provides a unique transmission path between all input and all output ports. When data arrives at an input port of the matrix switch, the switch determines which output port the data must emerge from, conveys the data through one of the switching elements to the output port, and then transmits the data from the output port.

Matrix architectures are superior to bus architectures with regards to cost, scalability and performance. Since each of the switching elements is identical, their higher volume production decreases cost. Scalability is enhanced because only identical parts (i.e. switch elements, input and output ports) are needed to increase matrix switch capacity and performance is not degraded as capacity is increased. Performance for a matrix switch is superior to bus switches because each input port has numerous paths to any output port. This eliminates internal switch competition.

Matrix switches suffer from a common phenomenon known as collision. Collisions occur when data arrives internally or externally at the same switching element of the matrix switch. These collisions can cause data to be lost or delayed; resulting in reduced overall network performance and reliability. Among matrix switch designs, some architectures are considered to be better than others depending on how well they avoid collisions, while at the same time minimizing propagation delay, facilitating scalability and lowering implementation cost.

Numerous methods for preventing data collisions in matrix switch architectures have been devised. Some utilize data buffering. Data buffering involves adding memory to parts of the matrix switch. The additional memory may be used to store the data in order to avoid a collision. In addition, computer processors can be utilized to determine switch element availability before a switch element is used to transfer data from an input port to an output port. This method is often called load balancing and traditionally utilizes stochastic processes to predict switching element utilization.

Adding memory or microprocessors adds cost and increases propagation delay in matrix switch designs. An improvement of present day matrix switch designs is needed to decrease propagation delays, decrease costs, and improve scalability. To a large degree, the switch matrix design goes a long way toward accomplishing these goals and is superior to other designs such as the bus architecture. However, further improvements are needed to meet the growing needs of today's high-speed communications networks.

SUMMARY OF THE INVENTION

The present invention comprises a method for switching cells through a data switch. The present invention also comprises a data switch that embodies the method of the present invention. One of many objects of the present invention is to address current problems known in existing embodiments of data switches. For instance, one object of the present invention is to provide a method for switching data cells that is expandable and yet promotes high-speed operation. Yet another object of the present invention is to avoid internal collisions in a matrix type data switch without requiring buffer memory or algorithmically inefficient schemes for predicting switching element utilization. Accordingly, the present method provides for switching data cells through a matrix architecture wherein the data load required of any particular switching element in the matrix is dynamically driven by a load balancing scheme. The load balancing scheme that comprises the method of the present invention may be performed on a distributed basis; further promoting high-speed operation.

In one illustrative embodiment of a method according to the present invention, data cells may be routed through a data switch by first receiving the cells in an ingress unit. Once the cells are received in an ingress unit, they are directed to a plurality of virtual output queues. These virtual output queues may represent physical output ports that specific cells must be routed to. Hence, once a cell is directed to virtual output queue it may be considered as "logically" forwarded to a particular output port.

This illustrative method for routing cells through the data switch may provide for selecting a particular virtual output queue from which a cell may be actually routed to the output port. In one embodiment, a selection mechanism is employed that selects a particular virtual output queue from only those virtual output queues that may contain cells. That is to say, the selection mechanism does not consider virtual output queues that are empty at the time a selection may be made. In some embodiments, selection of a virtual output queue may be conducted in a round-robin manner.

Selecting a switching element from amongst the matrix of available switching elements comprises another step in one illustrative method according to the present invention. In order to effect a load balancing mechanism, selecting a switching element may be comprised of several steps. First, it may be necessary to determine the number of switching requests that are pending for each switching element for the selected virtual output queue. Typically, a switching element may be selected according to which switching element has the fewest number of pending switching requests from the selected virtual output queue. During operation, several switching elements may all have the same number of pending switching requests from the selected virtual output queue. Where several switching elements have the fewest number of pending switching requests from the selected virtual output queue, a random process may be used to select one of those switching elements.

According to one illustrative method of the present invention, determination of the number of pending switching requests may be accomplished by determining the length of the requests virtual output queue. In this illustrative method, there's one request virtual output queue corresponding to each virtual output queue for each switching element. The requests virtual output queue stores switching requests as there are received from various virtual output queues in a switch.

In yet another illustrative embodiment of a method according to the present invention, the number of pending switching requests for any particular switching element may be determined by examining the length of a tracking virtual output queue. In these types of embodiments, the tracking virtual output queue may be maintained in the ingress unit that maintains the virtual output queue selected for cell transfer. In one typical embodiment, the method provides that the tracking virtual output queue may reflect the status and contents of a request virtual output queue.

Once a switching element has been selected to service a cell stored in a virtual output queue, it may be routed through the switching element by first lodging a request for switching service with the selected switching element. As soon as the selected switching element can service the switching requests, it may issue a service-grant back to the selected virtual output queue. The cell may then be conveyed to the switching element after the service-grant is received. In some embodiments of a method according to the present invention, the request for switching service may be stored in a request virtual output queue. Once the switching element has serviced the switching requests, the switching request may be removed from the request virtual output queue.

In some embodiments of a method according to the present invention, switching cells through a data switch may further comprise the steps of conveying to an egress unit a time order sequence that defines the order in which cells are stored in a selected virtual output queue. This time order sequence may then be used to reorder cells as they arrive in the egress unit. The reorder cells may then be directed to an output queue. Cells may then emanate from the output queue so that they may be delivered to an output port.

The present invention also comprises a high bandwidth switching unit that embodies the method described henceforth. According to one illustrative embodiment, a high bandwidth switching unit may comprise a plurality of ingress processors, a plurality of queue selectors, a plurality of non-buffered crossbar switches, a plurality of egress processors and a plurality of load balancing units. According to this illustrative embodiment, queue selectors and load balancing units are typically associated with an ingress processor.

In operation, cells are typically received in the ingress processors where they are routed to particular virtual output queues based on the destination of each particular cell. Each of these virtual output queues corresponds to a particular egress processor. The queue selectors select a virtual output queue from among those virtual output queues that are not empty and are maintained by that queue selectors' corresponding ingress processor. The queue selector may then generate a switching request to a selected one or more of the plurality of cross bar switches. The load balancing units typically select one or more of the plurality of crossbar switches that may receive the switching requests generated by the queue selectors. As soon as a crossbar switches able, it will route cells from the selected virtual output queue to a particular egress processor. The egress processor may then direct the cells to an output queue that is typically maintained in the egress processor.

In some embodiments of the present invention, an ingress processor may further comprise a cell sequence identification unit. The cell sequence identification unit typically attaches a sequence identifier to cells that may be stored in each virtual output queue maintained in that ingress processor. In this embodiment of a high bandwidth switching unit, each of the plurality of non-buffered crossbar switches is capable of propagating the cell sequence identifier that has been attached to cells stored in the virtual output queues. Also in this embodiment, each egress processor may further comprise a cell aggregator. The cell aggregator typically receives cells and their associated cell sequence identifiers and directs these cells to an output queue in accordance with the cell sequence identifier attached to each cell.

In order to determine which virtual output queues maintained in an egress processor are not empty, queue selectors may comprise a virtual output queue meter. The virtual output queue meter typically monitors the status of each virtual output queue and in some embodiments may generate a selection request for every virtual output queue that is not empty. The queue selector may also comprise round-robin arbiter. The round-robin arbiter may selected one virtual output queue from among those virtual output queues with the corresponding active selection request generated by the virtual output queue meter.

In one illustrative embodiment of the present invention, a load balancing unit may comprise a minimum queue length identification unit and a pseudorandom selection unit. The minimum queue length identification unit typically monitors the number of switching requests pending from each virtual output queue maintained in the ingress processor associated with the load balancing units. According to this illustrative embodiment, the load balancing unit may select cross-bar switches that have the fewest number of switching requests pending from a particular virtual output queue that needs switching service.

In yet another illustrative embodiment of the present invention, request virtual output queues are maintained in order to track cross-bar switch utilization. In one example embodiment, one request virtual output queue is maintained for each virtual output queue for each cross-bar switch. According to this time of embodiment of the invention, the number of pending switch requests for any virtual output queue for any cross-bar switch may be correlated with the number of request entries stored in the corresponding request virtual output queue.

In one illustrative embodiment of the present invention, request virtual output queues are typically maintained within each of the plurality of cross-bar switches. Because the load balancing units may be incorporated into individual ingress processors, extensive communications between each ingress processor and each cross-bar switch may be necessary whenever the load balancing units interrogate the request virtual output queues. To alleviate this, some embodiments of the present invention may further comprise the capability to maintain tracking request virtual output queues that are more easily accessible by the load balancing units. According to these embodiments, a tracking request virtual output queue may be maintained for each request virtual output queue in the system. A tracking request virtual output queue is typically structured to mirror the contents of its corresponding request virtual output queue.

In another example embodiment of the present invention, a switching unit may further comprise a plurality of crossbar schedulers that corresponded to each of the plurality of cross-bar switches comprising the switch. Each cross-bar schedulers may receive switching requests from the plurality of queue selectors associated with each ingress processor. Each cross-bar scheduler may issue grant signals back to the queue selectors. The total number of grant signals that may be active at any one time is typically limited by the number of cross-bar switches in a particular implementation of a switching unit.

In one illustrative embodiment of the present invention, switching requests are generated by queue selectors and are forwarded by the load balancing units to cross-bar switches. The switching requests may then be lodged in request virtual output queues. Once a cross-bar switch services the switching request, as dictated by the cross-bar scheduler, switching requests made and be removed from the request virtual queue.

BRIEF DESCRIPTION OF THE DRAWINGS

The foregoing aspects are better understood from the following detailed description of one embodiment of the invention with reference to the drawings, in which.

DETAILED DESCRIPTION OF THE INVENTION

The present invention comprises a method for switching data cells and an apparatus comprising a data switch. Such a data switch may also be comprised of a plurality of parallel and independent switch components. These parallel and independent switch components embody the method of the present invention. Various embodiments of this invention foster scalability by allowing addition and removal of parallel switch components as the need to adjust the data bandwidth capacity of a particular switch arises.

Figure 1:
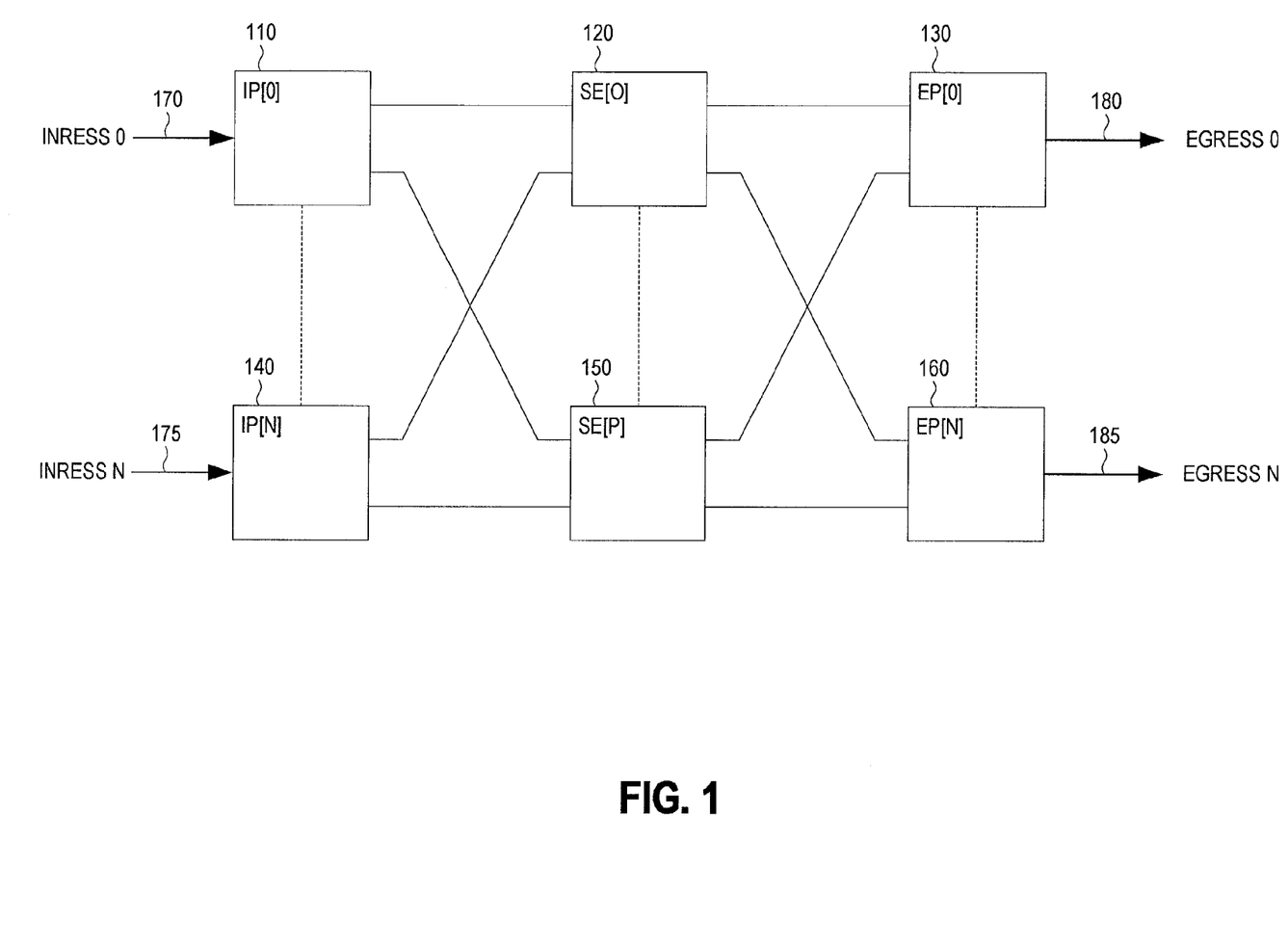
FIG. 1 is a block diagram that depicts a data switch architecture according to one example embodiment of the present invention.

FIG. 1 is a block diagram that depicts a data switch architecture according to one example embodiment of the present invention. In this embodiment, data cells are transferred from a plurality of ingress processors, typically referred to as IP[0] through IP[n] (110 and 140), through a plurality of switching elements, that may be referred to as SE[0] through SE[p] (120 and 150), to a plurality of egress processors, that may be referred to as EP[0] through EP[n] (130 and 160).

Data cells entering the switch architecture through any of a plurality of ingress ports (170,175) may emerge from any of a plurality of egress ports (180,185). Data cells intended to leave the switch at a given egress port may travel through any one of a plurality of switch elements (120,150) from any of a plurality of originating ingress ports (170, 175). In some embodiments of the present invention, each switch element, SE[0] 120 through SE[p] 150, may have a connection to every ingress processor, IP[0] 110 through IP[n] 140, and every egress processor, EP[0] 130 through EP[n] 160.

The present invention comprises a queuing structure. In one example apparatus according to the present invention, the queuing structure may be distributed across all of the switch architecture components, namely IP[0] 110, SE[0] 120, and EP[0] 130 through IP[n] 140, SE[p] 150, and EP[n] 160. The present invention comprises a load balancing method that utilizes elements of the queueing structure distributed across every IP[n] 140, SE[p] 150, and EP[n] 160. The load balancing method utilizes the queueing structure to select an optimal SE to transfer a data cell from a given IP to a given EP.

Figure 2:
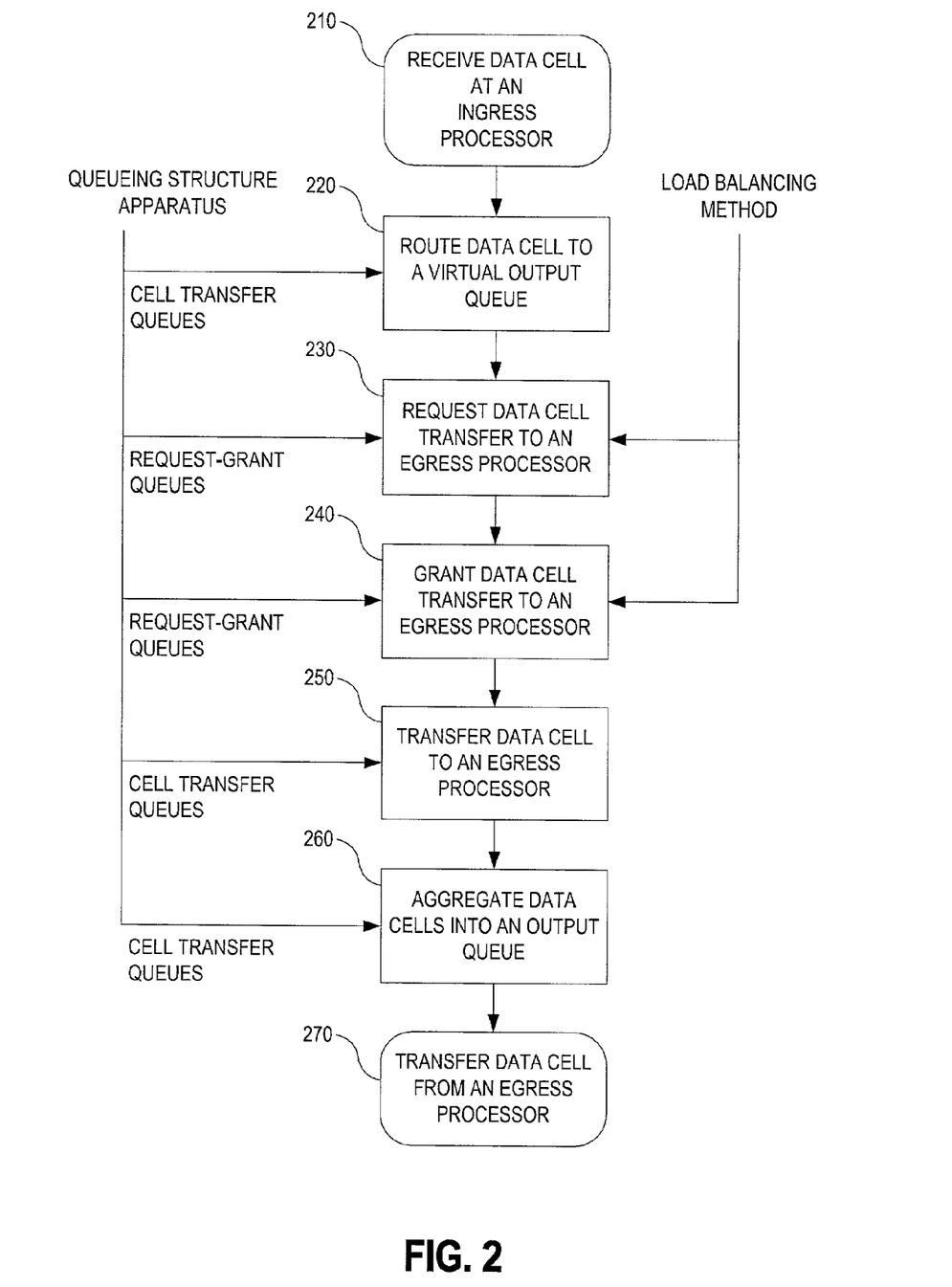
FIG. 2 is a flow diagram that depicts the process steps typically associated with transferring data cells through a data switch according to one example of the present invention.

FIG. 2 is a flow diagram that depicts the process steps typically associated with transferring data cells through a data switch according to one example of the present invention. According to this example method, data cells arrive at a data switch at one of a plurality of ingress ports (step 210). These data cells typically contain information indicating one of a plurality of egress ports they should be conveyed to and subsequently transmitted from. After arriving at one of a plurality of ingress ports, a data cell may be received by the associated ingress processor. Once the cell data is received by one of a plurality of ingress processors, the queuing structure and load balancing method of this illustrative embodiment of the present invention collectively control the transfer of the data cell to one of a plurality of egress processors.

Once the data cell has been received by one of a plurality of ingress processor, the data cell is routed to one of a plurality of virtual output queues based on the egress port it is to be transmitted from (step 220). The virtual output queue comprises one example embodiment of a cell transfer queue according to the present invention. It is typically comprised of enough memory to hold a plurality of data cells simultaneously. It may also be comprised of additional memory that contains supplemental routing information about the data cell.

After the data cell has been placed in the proper virtual output queue commensurate with this example embodiment of the present invention, a request is made to transfer the data cell to its intended egress processor (step 230), where it may be transmitted from the destination egress port. In some embodiments more than one virtual output queue may contain data cells. In this situation a request is made to transfer data from only one virtual output queue that may be selected in a round robin fashion. The request is made according to the load balancing method of the present invention. A logic state machine may be used to execute the steps of the present method. The load balancing method of the present invention utilizes one of a plurality of request-grant queues that may also further comprise the invention. Request-grant queues may vary in structure and are typically comprised of enough memory to hold the status of a plurality of data cells transferring through a plurality of ingress processor, switching elements, and egress processors comprising a data switch.

Next, in this example embodiment of the present invention, the data cell transfer request may be granted (step 240) according to the load balancing method, and recorded in one of the plurality of request-grant queues. Subsequently, the data cell is transferred from one of the plurality of ingress processor virtual output queues to the specified egress processor (step 250). Upon arriving at one of a plurality of egress processors, the data cell may optionally be aggregated (step 260) with a plurality of other data cells into an output queue comprising the receiving egress processor. The aggregation process may comprise ordering the cells in the sequence they arrived in. An output queue comprises one embodiment of a cell transfer queue that is typically comprised of enough memory to hold a plurality of data cells simultaneously. In this example embodiment of the present invention, the cell transfer operation is completed when the data cell is transmitted from the egress processor (step 270).

Figure 3:
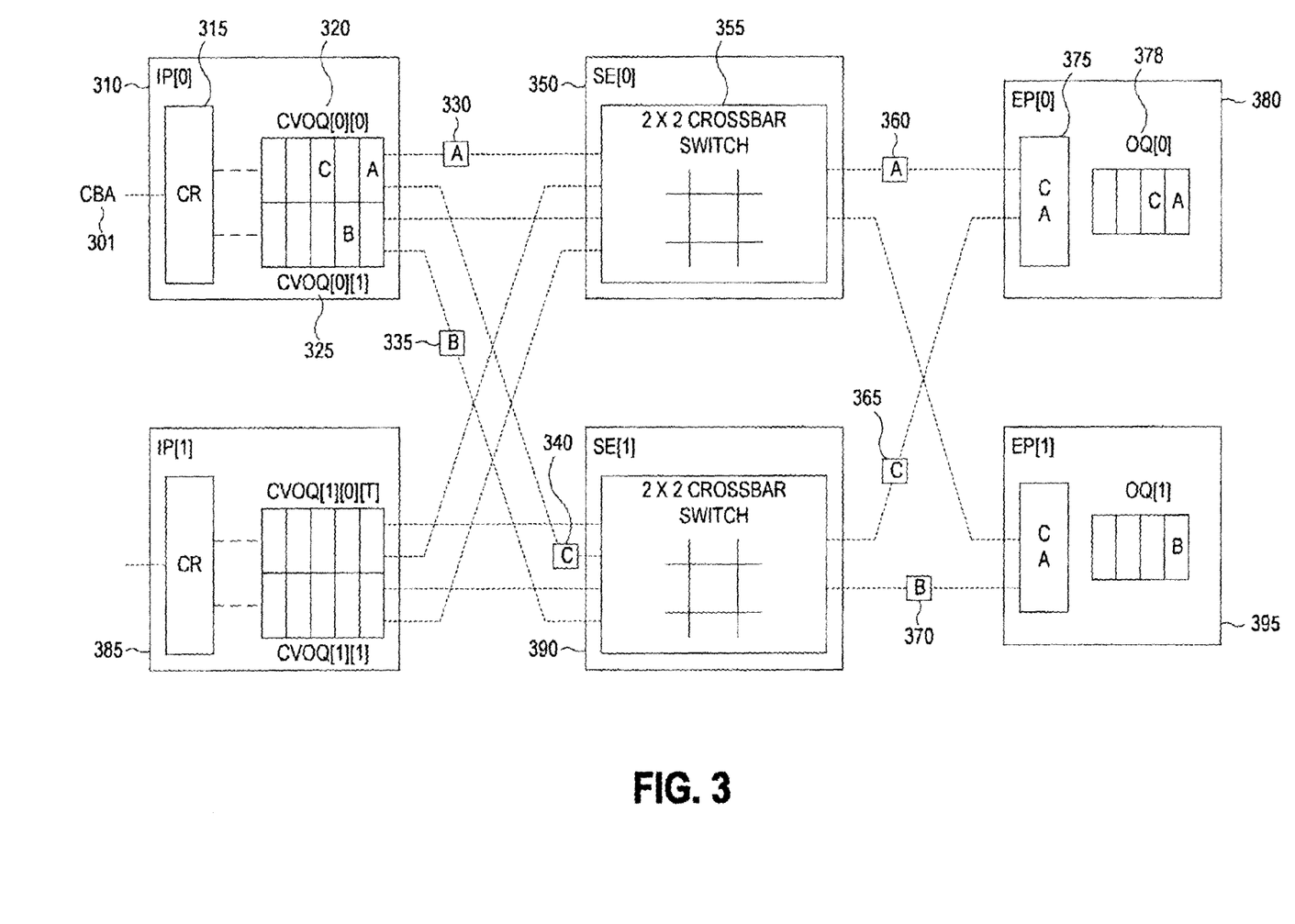
FIG. 3 is a block diagram depicting one example embodiment of the cell transfer apparatus and operation of the present invention.

FIG. 3 is a block diagram depicting one example embodiment of a cell transfer apparatus that operates in accordance with teachings of the present invention. It is useful in understanding the cell transfer operation and queueing structure of the present invention. This illustrative example embodiment of the present invention comprises of a plurality of switching elements (FIG. 1 120 or 150) that may be added or removed as needed. This example embodiment also comprises an ingress processor, which may be referred to as IP[0] 310, and an egress processor, which may be referred to as EP[0] 380.

Each ingress processor may be further comprised of a cell router, that may be referred to as CR 315, and a plurality of cell virtual output queues, which may be referred to as CVOQ[0][0] 320 and CVOQ[0][1] 325. In this embodiment of the present invention, within each ingress processor, there is one CVOQ for every egress processor within the data switch under consideration. In this case, CVOQ[0][0] 320 refers to the CVOQ containing data cells in IP[0] 310 that are to be transferred to EP[0] 380. Additionally, CVOQ[0][1] 325 refers to the CVOQ containing data cells in IP[0] 310 that are to be transferred to EP[1] 395. Note that in this case, IP[0] 310 has a plurality of outputs to all other switching elements, which may be referred to as SE[0] and SE[1] (350, 390). All CVOQs in the example embodiment of the present invention are similar in this fashion. In addition, a CVOQ typically comprises a first-in-first-out (FIFO) buffer device large enough to hold a plurality of data cells simultaneously. The CR 315 is typically comprised of a logic device that examines the incoming data cells, determines their egress port destination and places the data cell in the proper CVOQ.

Each switching element may be referred to as SE[0] 350. The switching elements may be further comprised of a crossbar switch 355. In this case, the crossbar switch has no memory for buffering or queueing transferred cells. This attribute helps to reduce the overall propagation delay any data switch constructed according to the teachings of the present invention may exhibit.

In this embodiment of the present invention, the crossbar switch comprises an input from every ingress processor in the data switch under consideration. In addition, the crossbar switch comprises an output to every egress processor in the data switch under consideration. This example configuration allows a switching element to transfer a data cell from any ingress processor to any egress processor within the data switch under consideration. This also means that a data cell in one of a plurality of ingress processors can be transferred to any one of a plurality of egress processors through any one of a plurality of switching element crossbar switches.

Each egress processor, may be referred to as EP[0] 380. Each egress processor may be further comprised of a cell aggregator, which may be referred to as CA 375, and an output queue, which may be referred to as OQ[0] 378. Note that the CA comprises an input from every switching element in the example data switch under consideration. The CA 375 receives incoming cells from a plurality of SEs and places them in their proper order into OQ[0] 378. A CA 375 is typically comprised of a computing device that is able to examine incoming data cells and re-order them. In addition, CAs may comprise enough memory to store one data cell from every ingress processor in the data switch under consideration. Similarly, OQs may comprise enough memory to store one data cell from every ingress processor.

In this example embodiment of the present invention, consider data cells ABC 301 being transferred through the example data switch. Cells A, B, and C arriving at IP[0] 310 are examined one after another by CR 315 and placed in the appropriate CVOQ. For this example, assume that cells A, B, and C are to be transferred to EP[0] 380, EP[1] 395 and EP[0] 380 respectively. That being the case, data cell A is queued in CVOQ[0][0] 320, data cell B is queued in CVOQ[0][1] 325 and data cell C is queued in CVOQ[0][0] 320 after data cell A. When the crossbar switch comprising SE[0] 355 is able, it transfers data cell A from IP[0] CVOQ[0][0] output 330 to EP[0] input 360. When the crossbar switch comprising SE[1] is able, it transfers data cell B from IP[0] output 335 to EP[1] input 370. When the crossbar switch comprising SE[1] is able, it transfers data cell C from IP[0] output 335 to EP[1] input 365. CA 375 comprising EP[0] 380 examines incoming data cells and places them in the OQ[0] 378 in their proper order according to their arrival at IP[0] 310.

Figure 4A:
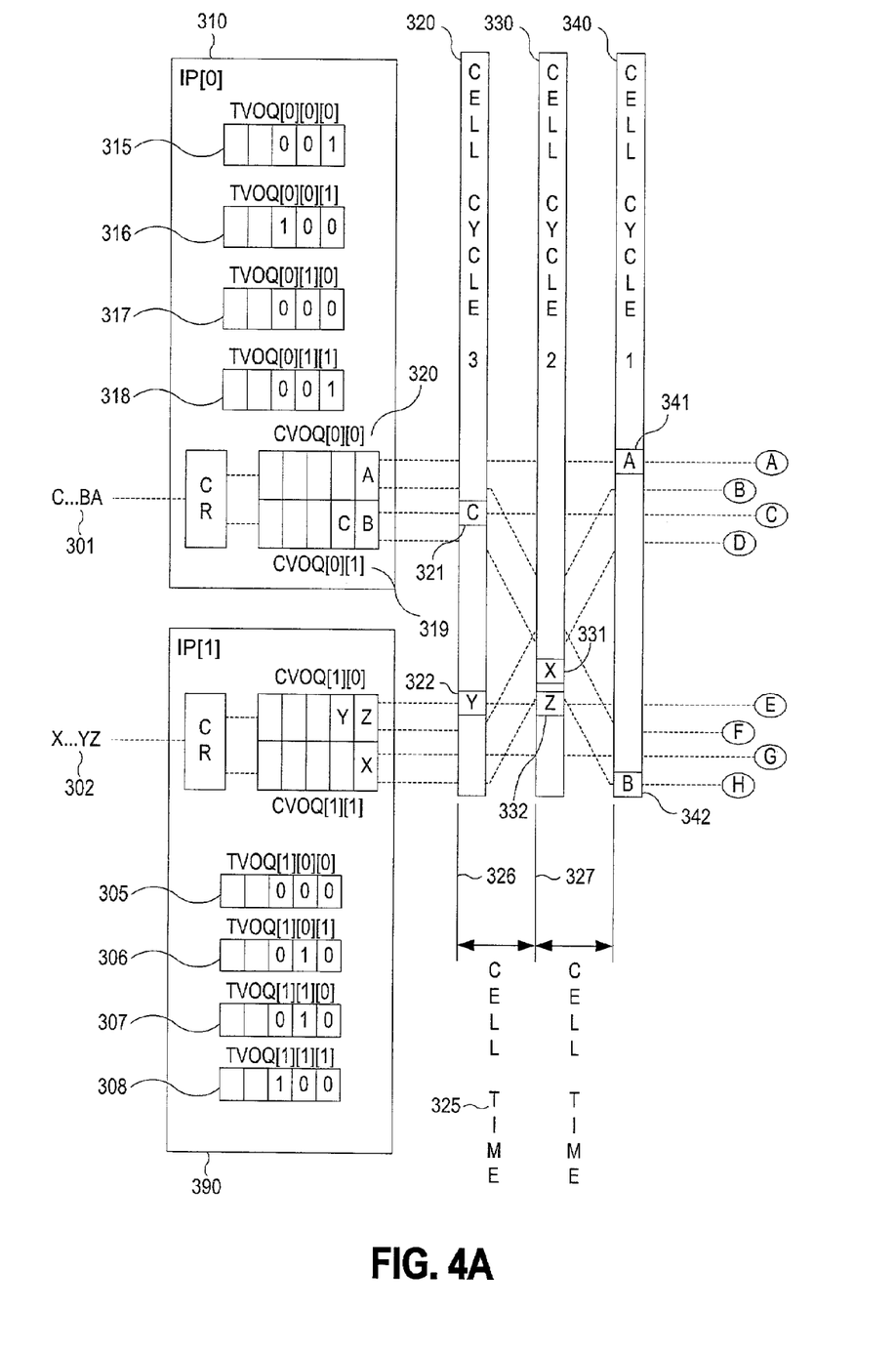
FIGS. 4A and 4B are block diagrams depicting one example embodiment of a request-grant mechanism comprising the present invention.
Figure 4B:
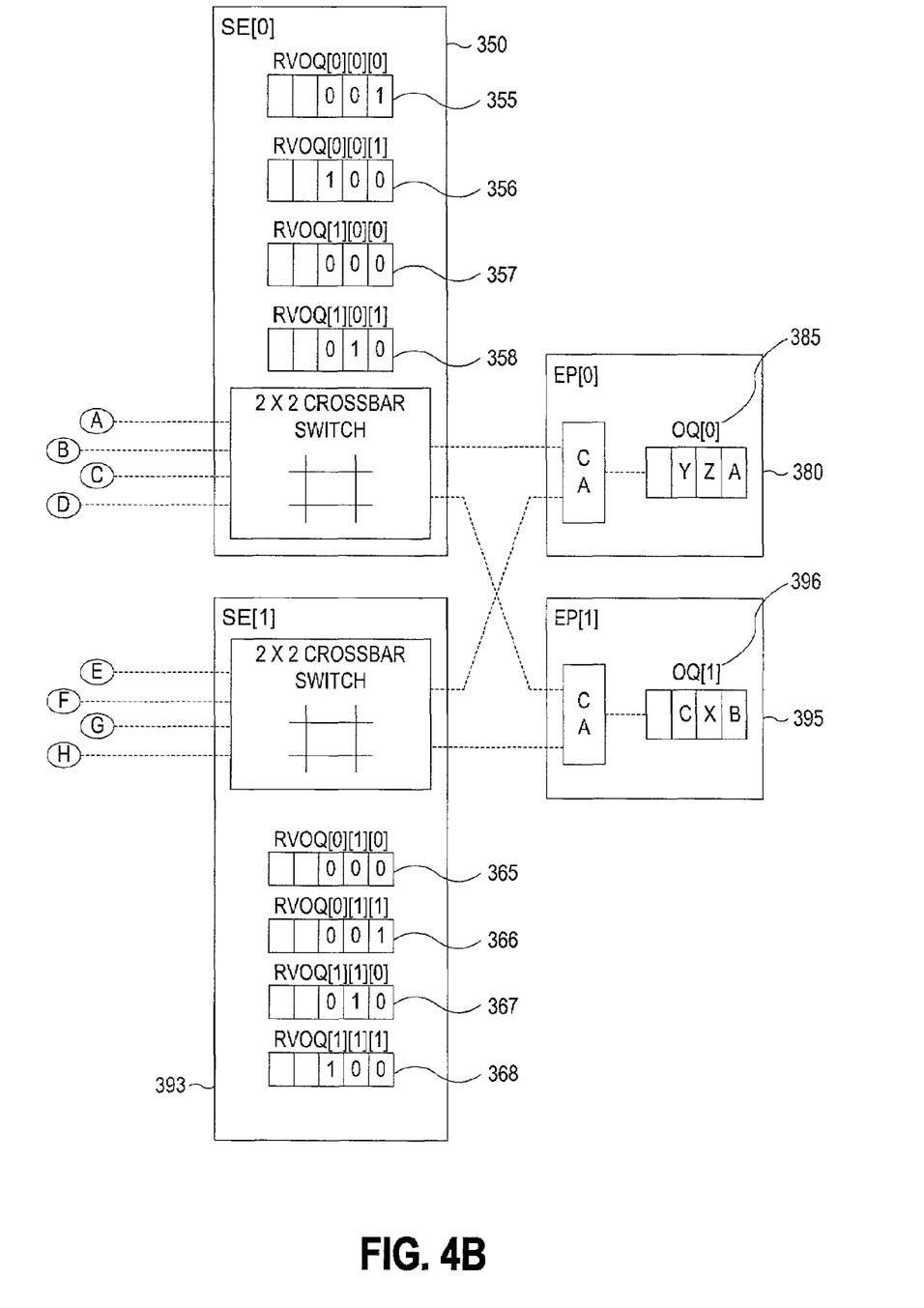

FIGS. 4A and 4B are block diagrams depicting one example embodiment of a request-grant mechanism comprising the present invention. The load balancing method of the present invention may rely on the request-grant mechanism of the present example embodiment as discussed infra. In this illustrative example, the function of the request-grant apparatus queue is to keep a record of cell transfer requests and grants. The request-grant record is typically used to coordinate the cell transfer operation of this and potentially other embodiments of the present invention. Later in the switching process, the request-grant queues may be utilized by the load balancing method to arbitrate which cells actually receive a transfer grant.

In this example embodiment, the request-grant apparatus may be comprised of a plurality of request virtual output queues, one of which may be referred to as RVOQ[0][0][0] 355. The request grant apparatus may be further comprised of a plurality of tracking virtual output queues, one of which may be referred to as TVOQ[0][0][0] 315. The respective TVOQs and RVOQs are mirror images of each other and are constantly updated as cells are transferred through the data switch under consideration. In this and other possible embodiments of the present invention, the TVOQs and RVOQs represent the request-grant status of specific data cells and their path from IPs through SEs to EPs within the data switch under consideration.

Pluralities of TVOQs are maintained in all of the ingress processors of the data switch under consideration. Every ingress processor comprises one TVOQ for every path from that ingress processor through every SE to every EP in the data switch under consideration. Put in another fashion, the number of TVOQs in an ingress processor may equal the number of switch elements times the number of egress processors (i.e. #TVOQs=#SEsx#EPs) in the data switch under consideration.

For the purposes of this illustration, an array index convention is used to refer to a TVOQ that maintains the request-grant status. For example, TVOQ[0][0][0] 315 refers to IP[0] 310, SE[0] 350, and EP[0] 380, respectively. In this embodiment, each TVOQ is comprised of enough memory to keep track of every data cell in the ingress processor the TVOQ is maintained in. According to some embodiments of the present invention, the TVOQ or RVOQ may only require one logic bit to keep track of the request-grant status of each data cell. For instance, a logic bit value of one may indicate a cell request and a value of zero represents no request in the entry.

In this example embodiment, the first position of the TVOQ[0][0][0] 320 from right-to-left represents the grant-request status for the respective data cell at the head of the CVOQ[0][0] FIFO 320. A value of one in TVOQ[0][0][0] 315 indicates a request to transfer the cell in CVOQ[0][0] 320 through SE[0] 350 to EP[0] 380. The cell transfer apparatus of this embodiment fetches cell payloads from the head of the CVOQs according to the grant-status of the respective TVOQ or RVOQ. To continue with this example comprising one embodiment of the present invention, data cell B in CVOQ[0][1] 319 has a request status indicated in TVOQ[0][1][1] 318. TVOQ[0][1][1] 318 indicates a request in the same round robin cycle as data cell A. However in this case, the request is through SE[1] 393. In the next cycle of the round-robin process, the TVOQs contain zeros in all positions indicating that no requests are pending during that cycle for that EP. In the last cycle, TVOQ[0][0][1] 316 indicates a request grant for the next data cell in CVOQ[0][1] 319. In this case, data cell C, in CVOQ[0][1] 319, is requesting to be transferred through SE[0] 350 to EP[1] 395.

FIGS. 4A and 4B further depict the structure of request virtual output queues (RVOQs) according to one example embodiment of the present invention. The RVOQs comprise the request-grant queueing apparatus in a plurality of SEs, that may be referred to as SE[0] and SE[1] (350,393 respectively). In this example, a plurality of RVOQs are maintained in each instance of a plurality of SEs within the data switch under consideration. There is one RVOQ to keep track of all requests and grants for all possible cell transfers between all IPs and EPs, in the given SE, of the data switch under consideration. Put in another fashion, the number of RVOQs in a single SE may equal the number of IPs times the number of EPs (i.e. #RVOQs=#IPsx#EPs). Each RVOQ, according to this example embodiment of the present invention, may be comprised of enough memory to keep track of all possible cell requests comprising the SE in the data switch under consideration. Each RVOQ may only require one bit to keep track of the request-grant status of each data cell. In this embodiment, an array index convention is used such that the notation for referring to a RVOQ that maintains the request-grant status for IP[0], SE[0], and EP[0] is RVOQ[0][0][0] 355, respectively. Note that the RVOQs of SE[0], in this example embodiment, only refer to the request-grant status of cells transferring through that specific SE.

In this and possibly other embodiments of the present invention, the RVOQs operate in a similar FIFO fashion as the TVOQs of the example IPs discussed earlier. In this example, the RVOQs of a given SE refer to the cell transfer paths from every IP to every EP through the given SE. In this example case, RVOQ[0][0][0] 355 reflects a request grant in the first evaluation cycle for data cell A indicated in this case by a value of one. The other RVOQs, namely RVOQ[0][0][1] 356, RVOQ[1][0][0] 357, and RVOQ[1][0][1] 358, reflect no requests indicated by a value of zero in the first position. In a second evaluation cycle, request for data cell X is transferred to the crossbar switch indicated by a value of 1 in RVOQ[1][0][1] 358. In a subsequent evaluation cycle, RVOQ[0][0][1] 356 indicates a cell transfer request that will allow data cell Y to be transferred through SE[0] 350 to EP[0] 380.

The time between successive cell cycles, for example 330 and 320, may be referred to as the cell time 325. This time may be measured from the end of one cell cycle 327 to the end of the next cell cycle 326. In this and other embodiments of the present invention, numerous process steps take place simultaneously during this periodic timeframe. The simultaneous activities may include but are not limited to, cell transfer, request-grant interactions, and load balancing determinations.

Figure 5:
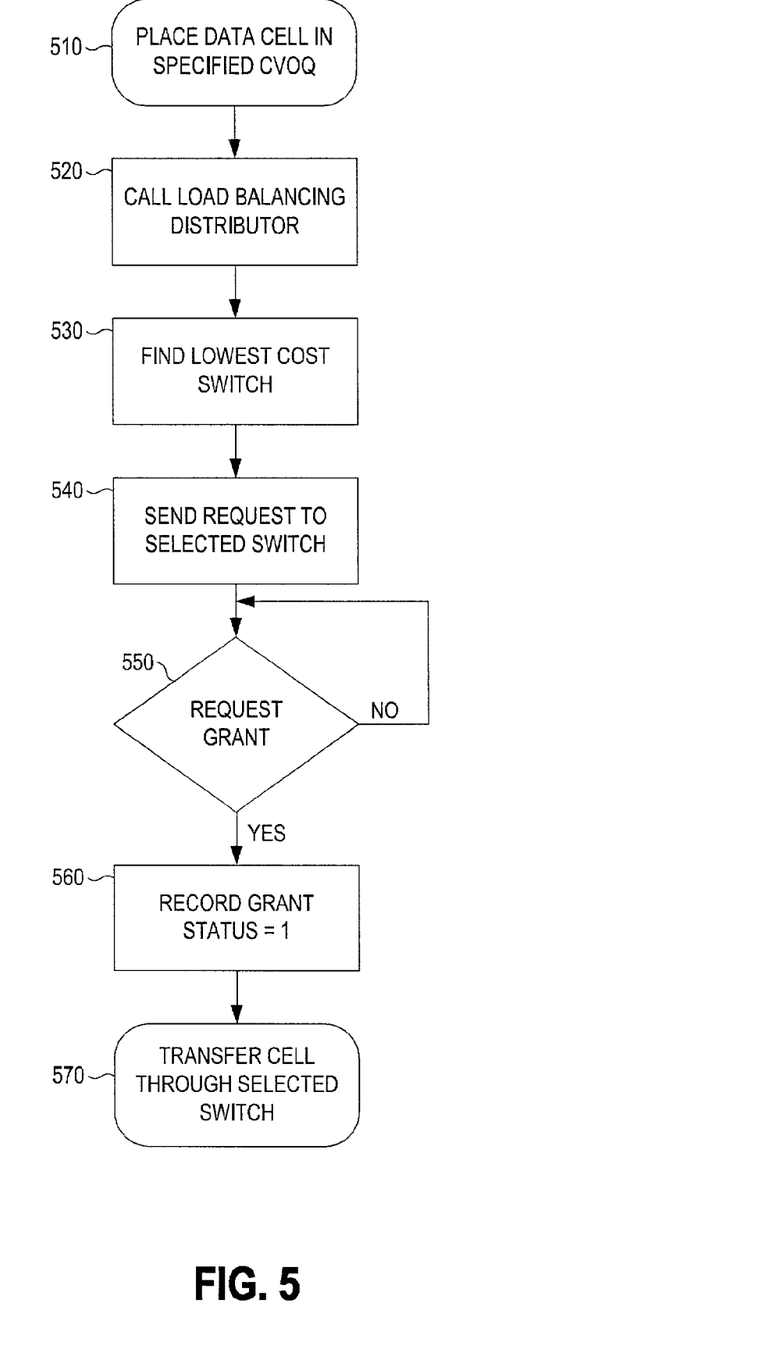
FIG. 5 is a flow diagram that depicts the process steps typically associated with selecting a switching element to transfer a data cell from an IP to an EP according to one embodiment of the present invention.

FIG. 5 is a flow diagram that depicts the process steps typically associated with selecting a SE to transfer a data cell from an IP to an EP according to one illustrative embodiment of the present invention. The load balancing method comprises an SE selection process. The load balancing method may be further comprised of a cell transfer cost analysis method, sometimes referred to as cost and sub-cost functions. After a data cell is placed in the appropriate CVOQ of a given IP (step 510), the load balancing method (step 520) is used to select a candidate SE to transfer the data cell from the originating IP to the specified EP.

After a candidate SE has been selected (step 530), a transfer request is sent (step 540). The request waits in the SEs RVOQs until granted, the cell is transferred through the selected switch 570. Multiple instances of this process comprising execution of a load balancing method may be performed in parallel according to one example embodiment of a data switch comprising the present invention.

Figure 6:
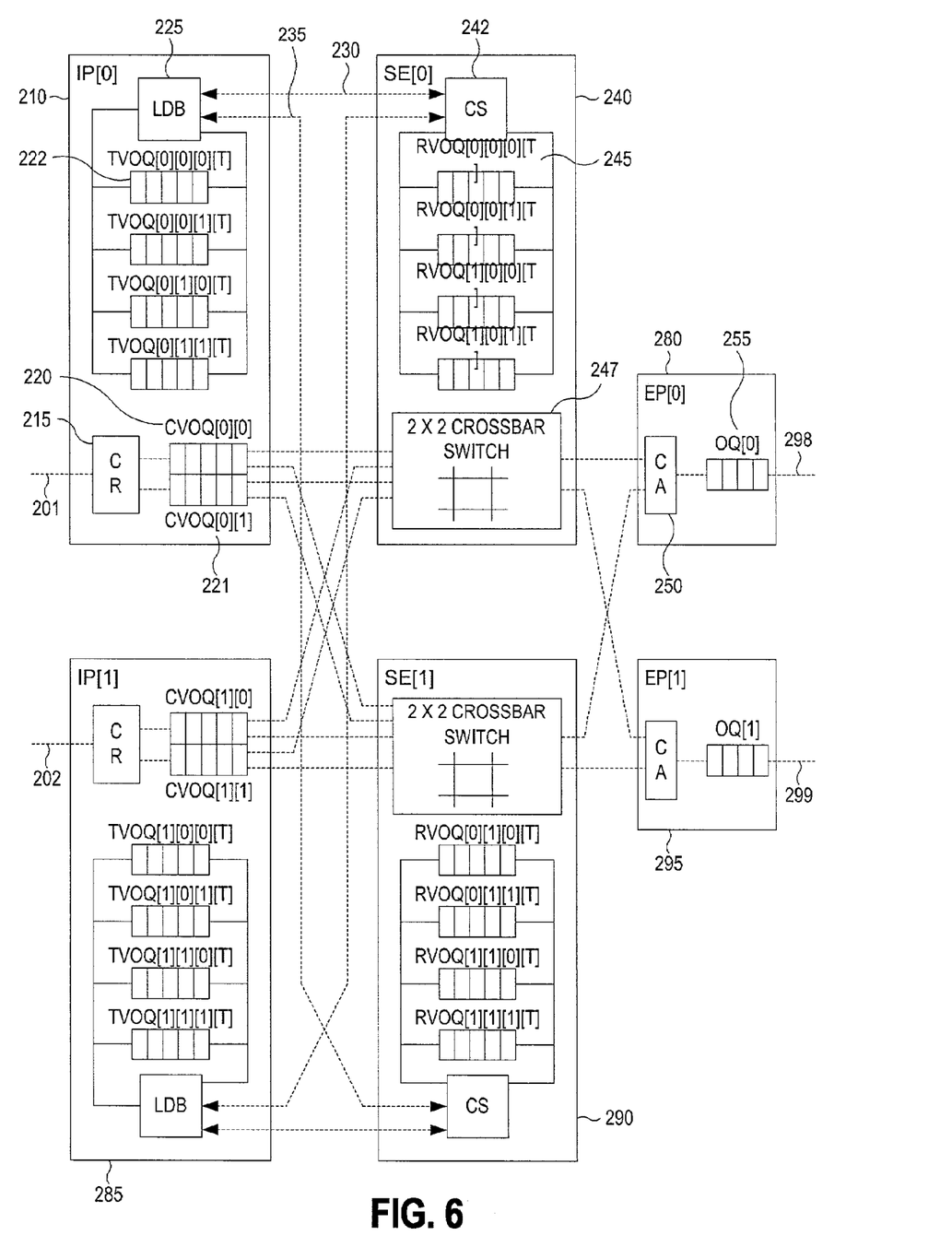
FIG. 6 is a block diagram depicting one example embodiment of a load balancing mechanism comprising the present invention.

FIG. 6 is a block diagram depicting one example embodiment of a load balancing mechanism comprising the present invention. A load balancing distributor (LBD) 225 and a crossbar scheduler (CS) 242 comprise a load balancing mechanism in this example embodiment of the present invention. A data switch may be comprised of a plurality of LBDs and CSs corresponding to each switching module. Typically, an LBD 225 comprises an IP, which may be referred to as IP[0] 210, and a CS comprises a SE, which may be referred to as SE[0] 240. The LBD 225 typically embodies the load balancing method that comprise the method of the present invention. One example implementation of an LBD 225 may comprise a logic-device-based state machine and a data storage element. The LBD comprises a connection to every CS (230 and 235) in this example embodiment such that it can send cell transfer requests to every CS. The same connection may be used to receive cell transfer grants and switch load information, which may be stored in the plurality of RVOQs in any given SE. The cell grant and switch load information may be copied into the plurality of TVOQs in any given IP.

To better describe the operation of the load balancing method in conjunction with the request-grant mechanism according to this example embodiment of the present invention, consider the arrival and transfer of data cells at the IP[0] ingress port 201 to one of a plurality of SEs. A data cell is routed by the CR 215 to the appropriate CVOQ, which may be referred to as CVOQ[0][0] 620 or CVOQ[0][1] 221. The load balancing method executed by the LBD causes the LBD to examine the TVOQs comprising the IP in a round robin fashion to locate a candidate SE to transfer the data cell. The load balancing method may utilize a cost analysis method to determine the lowest cost SE to transfer the data cell.

The load balancing method is intended to locate the SE that will transfer the data cell in the shortest amount of time. Embodiments of the present invention may accomplish this in a number of ways that may include, but are not limited to analyzing the total number of cell requests pending in a given TVOQ, the number of pending requests for a specific SE from the requesting LBD, the number of pending requests for a specific SE to the specific EP, and the number of pending requests for a specific SE below a predetermined threshold.

In one embodiment of the present invention, the load balancing method uses the local TVOQs to determine which SE to request a cell transfer from. After making this determination, the LBD sends a cell transfer request to the CS in the specified SE, which may be referred to as SE[0] 240 or SE[1] 290, through connections 630 or 635. The CS in the specified SE replies with a grant along with updated RVOQ information. The LBD updates its local TVOQ with the newly received information and continues the switch selection operation for the same or next data cell.

What is claimed is:

1. A method for switching cells through a data switch comprising the steps of:
   receiving cells:
   directing the received calls into a plurality of virtual output queues by directing each cell to a particular virtual output queue according to the output destination of that cell;
   selecting a virtual output queue from which to route a cell to a switching element;
   selecting said switching element from a plurality of switching elements wherein the switching elements are non-buffered cross-bar switches; and
   routing a cell from the selected virtual output queue through the selected switching element to an output queue;
   wherein the step of selecting a switching element comprises the steps of:
   determining the number of pending switching requests for the selected virtual output queue received by each switching element;
   selecting the switching element that has the fewest number of pending switching requests if there is one switching element that has an overall lowest number of pending switching requests; and
   randomly selecting one switching element from among those switching elements that have the fewest number of pending switching requests if there are a plurality of switching elements that have the same fewest number of switching requests.

2. The method of claim 1 further comprising the step of reordering cells in the output queue according to the order in which the cells were received in a virtual output queue that corresponds to said output queue.

3. The method of claim 1 wherein the step of selecting a virtual output queue from which to route a cell comprises the step of selecting a virtual output queue in a round-robin manner from a subset of virtual output queues that contain cells awaiting transfer to an output queue.

4. The method of claim 1 wherein the step of determining the number of switching requests pending for each switching element from the selected virtual output queue comprises the step of determining the length of a request virtual output queue that stores successive switching requests as they are received from virtual output queues wherein each switching element has affiliated with it a request virtual output queue for each virtual output queue.

5. The method of claim 1 wherein the step of determining the number of switching requests pending for each switching element from the selected virtual output queue comprises the step of determining the length of a tracking virtual output queue maintained in an ingress unit that reflects the contents of a request virtual output queue that stores successive switching requests as they are received from virtual output queues, wherein each switching element has affiliated with it a request virtual output queue for each virtual output queue.

6. The method of claim 1 wherein the step of routing the cell from the selected virtual output queue through the selected switching element comprises the steps of:
  lodging a request for switching service for the selected virtual output queue for the selected switching element;
  issuing a service-grant to the selected virtual output queue; and
  conveying the cell to the selected switching element after receiving the service-grant.

7. The method of claim 6 wherein the step of lodging a request for service for the selected switching element comprises the step of conveying a request to a request virtual output queue that stores successive switching requests as they are received from virtual output queues wherein each switching element has affiliated with it a request virtual output queue for each virtual output queue.

8. The method of claim 7 further comprising step of removing a request from the request virtual output queue when a grant has been issued in response to that request.

9. A high bandwidth switching unit comprising:
  a plurality of non-buffered, cross-bar switches;
  a plurality of ingress processors that each comprise an inbound interface and maintain a plurality of virtual output queues and route data cells that they receive on their inbound interface to a particular virtual output queue according to the destination of each cell;
  a plurality of queue selectors corresponding to the plurality of ingress processors that each select one virtual output queue from among those maintained in their associated ingress processor that are not empty and generates a switching service request for the selected virtual output queue;
  a plurality of load balancing units corresponding to the plurality of ingress processors that each select one cross-bar switch from among the plurality of cross-bar switches for each cell awaiting transfer from the virtual output queue maintained in the associated ingress processor and selected by the associated queue selector, and forwards the switching request generated by the queue selector to the selected cross-bar switch;
  a plurality of egress processors that each comprise an outbound interface and maintain an output queue and direct cells they receive from one or more of the plurality of cross-bar switches to their output queue and direct cells stored in their output queue to their outbound interface, wherein the cross-bar switches respond to switching service requests received from the load balancing units by routing cells from the selected virtual output queues to the plurality of egress processors; and
  wherein each of the plurality of ingress processors further comprise a cell sequence identification unit that attaches a sequence identifier to cells stored in the plurality of virtual output queues; and
  wherein each of the plurality of non-buffered cross-bar switches is capable of propagating the attached cell sequence identifier and their associated cells; and
  wherein each egress processor further comprises a cell aggregator that receives cells and associated cell sequence identifiers from a switching unit and directs the cells to the output queue in accordance with the cell sequence identifier associated with each cell.

10. The switching unit of claim 9 further comprising a plurality of cross-bar schedulers that correspond to the plurality of cross-bar switches that receive requests for switching service from the plurality of queue selectors corresponding to each of the ingress processors and issues a number of grant signals to one or more queue selectors, wherein the number of grant signals is equal to the number of cross-bar switches comprising a particular switch.

11. The switching unit of claim 9 further comprising a plurality of sets of request virtual output queues corresponding to each of the plurality of cross-bar switches wherein each set of request virtual output queues comprises one request virtual output queue for each virtual output queue maintained by each ingress processor and wherein each request virtual output queue stores successive switching requests from its associated virtual output queue.

12. The switching unit of claim 11 wherein each request virtual output queue removes switching requests in response to a grant notification received from a cross-bar scheduler.

13. A high bandwidth switching unit comprising:
  a plurality of non-buffered, cross-bar switches;
  a plurality of ingress processors that each comprise an inbound interface and maintain a plurality of virtual output queues and route data cells that they receive on their inbound interface to a particular virtual output queue according to the destination of each cell;
  a plurality of queue selectors corresponding to the plurality of ingress processors that each select one virtual output queue from among those maintained in their associated ingress processor that are not empty and generates a switching service request for the selected virtual output queue;
  a plurality of load balancing units corresponding to the plurality of ingress processors that each select one cross-bar switch from among the plurality of cross-bar switches for each cell awaiting transfer from the virtual output queue maintained in the associated ingress processor and selected by the associated queue selector, and forwards the switching request generated by the queue selector to the selected cross-bar switch;
  a plurality of egress processors that each comprise an outbound interface and maintain an output queue and direct cells they receive from one or more of the plurality of cross-bar switches to their output queue and direct cells stored in their output queue to their outbound interface, wherein the cross-bar switches respond to switching service requests received from the load balancing units by routing cells from the selected virtual output queues to the plurality of egress processors; and
  wherein each queue selector comprises:
    a virtual output queue meter that monitors the status of each virtual output queue maintained in the ingress processor associated with the queue selector and generates a selection request for every virtual output queue that is not empty; and
    round-robin arbiter that randomly selects one virtual output queue from among the selection requests it receives from the virtual output queue meter.

14. The switching unit of claim 13 further comprising a plurality of cross-bar schedulers that correspond to the plurality of cross-bar switches that receive requests for switching service from the plurality of queue selectors corresponding to each of the ingress processors and issues a number of grant signals to one or more queue selectors, wherein the number of grant signals is equal to the number of cross-bar switches comprising a particular switch.

15. The switching unit of claim 13 further comprising a plurality of sets of request virtual output queues corresponding to each of the plurality of cross-bar switches wherein each set of request virtual output queues comprises one request virtual output queue for each virtual output queue maintained by each ingress processor and wherein each request virtual output queue stores successive switching requests from its associated virtual output queue.

16. A high bandwidth switching unit comprising:
a plurality of non-buffered, cross-bar switches;
a plurality of ingress processors that each comprise an inbound interface and maintain a plurality of virtual output queues and route data cells that they receive on their inbound interface to a particular virtual output queue according to the destination of each cell;
a plurality of queue selectors corresponding to the plurality of ingress processors that each select one virtual output queue from among those maintained in their associated ingress processor that are not empty and generates a switching service request for the selected virtual output queue;
a plurality of load balancing units corresponding to the plurality of ingress processors that each select one cross-bar switch from among the plurality of cross-bar switches for each cell awaiting transfer from the virtual output queue maintained in the associated ingress processor and selected by the associated queue selector, and forwards the switching request generated by the queue selector to the selected cross-bar switch;
a plurality of egress processors that each comprise an outbound interface and maintain an output queue and direct cells they receive from one or more of the plurality of cross-bar switches to their output queue and direct cells stored in their output queue to their outbound interface, wherein the cross-bar switches respond to switching service requests received from the load balancing units by routing cells from the selected virtual output queues to the plurality of egress processors; and
wherein each load balancing unit comprises:
minimum queue length identification unit that monitors the number of pending switching requests from each virtual output queue maintained by the associated ingress processor for each of the plurality of cross-bar switches and creates a plurality of candidate switch signals corresponding to the plurality of cross-bar switches and activates said signals for those cross-bar switches that have the fewest number of said pending switch requests; and
pseudo random selection unit that randomly selects one cross-bar switch from among those cross-bar switches having their associated candidate switch signal set to an active state.

17. The switching unit of claim 16 further comprising a plurality of sets of request virtual output queues corresponding to each of the plurality of cross-bar switches wherein each set of request virtual output queues comprises one request virtual output queue for each virtual output queue maintained by each ingress processor and, each request virtual output queue stores successive switching requests from its associated virtual output queue, and, wherein the minimum queue identification unit determines the number of pending switching requests from each virtual output queue maintained by the associated ingress processor for each of the plurality of cross-bar switches by monitoring the status of its associated request virtual output queue in each set of request virtual output queues associated with the particular cross-bar switch.

18. The switching unit of claim 16 further comprising:
a plurality of sets of request virtual output queues corresponding to each of the plurality of cross-bar switches, wherein each set of request virtual output queues comprises one request virtual output queue for each virtual output queue maintained by each ingress processor, wherein each request virtual output queue stores successive switching requests from its associated virtual output queue;
a plurality of tracking virtual output queues that mirror the contents of the request virtual output queues and are grouped together into sets corresponding to the plurality of ingress processors, wherein each set comprises a tracking virtual output queue for each virtual output queue maintained by the ingress processor for each of the plurality of cross-bar switches; and
wherein the minimum queue identification unit determines the number of pending switching requests from each virtual output queue maintained by the associated ingress processor for each of the plurality of cross-bar switches by monitoring that status of its associated tracking virtual output queue in each group of tracking virtual output queues associated with the particular ingress processor.

19. The switching unit of claim 16 further comprising a plurality of cross-bar schedulers that correspond to the plurality of cross-bar switches that receive requests for switching service from the plurality of queue selectors corresponding to each of the ingress processors and issues a number of grant signals to one or more queue selectors, wherein the number of grant signals is equal to the number of cross-bar switches comprising a particular switch.

20. The switching unit of claim 16 further comprising a plurality of sets of request virtual output queues corresponding to each of the plurality of cross-bar switches wherein each set of request virtual output queues comprises one request virtual output queue for each virtual output queue maintained by each ingress processor and wherein each request virtual output queue stores successive switching requests from its associated virtual output queue.

* * * * *